Nov. 25, 1958  C. K. BROWN  2,861,379
FISHING ROD AND REEL ACCESSORY
Filed July 22, 1957
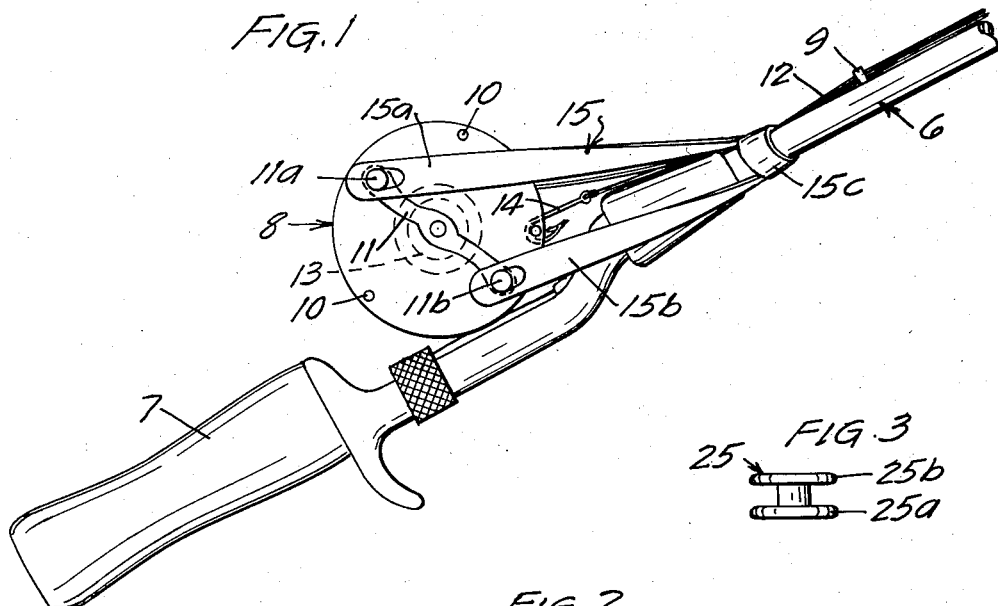
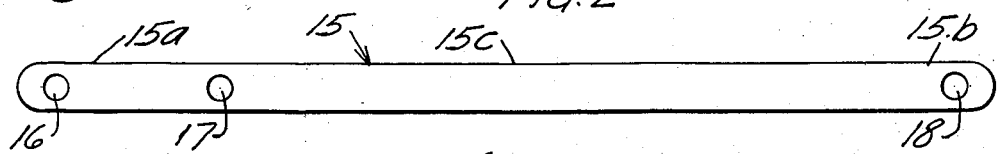
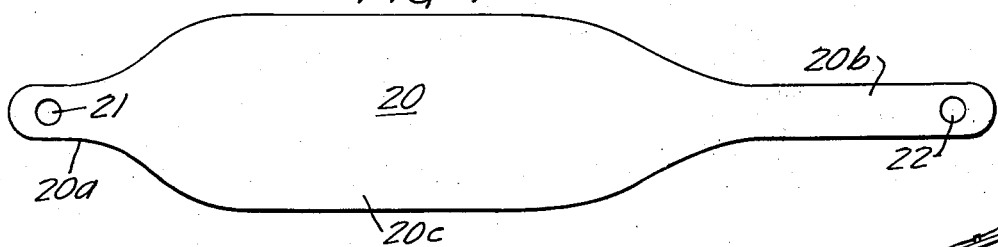
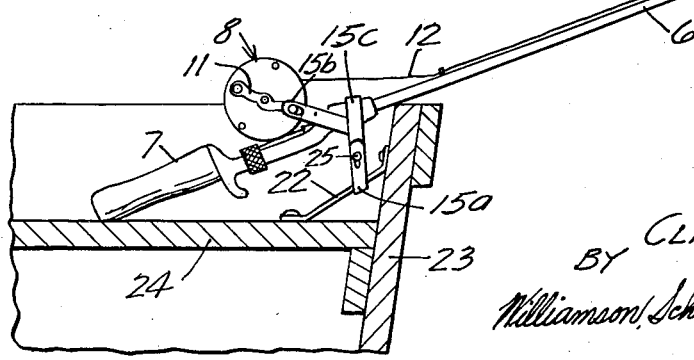
INVENTOR
CLIFFORD K. BROWN
BY
Williamson, Schroeder, Adams & Meyers
ATTORNEYS United States Patent Office 2,861,379
Patented Nov. 25, 1958

2,861,379
FISHING ROD AND REEL ACCESSORY
Clifford K. Brown, Duluth, Minn.
Application July 22, 1957, Serial No. 673,534
5 Claims. (Cl. 43—25.2)

This invention relates to fishing rods and reels. More particularly it relates to an accessory for use in conjunction with a fishing rod and reel for the purpose of facilitating the carrying or transporting of the rod and reel.

It is a general object of my invention to provide a novel and improved fishing rod and reel accessory to facilitate carrying, storage and transporting of the fishing rod and reel, the accessory being simple and inexpensive both as to construction and operation.

A more specific object is to provide a novel and improved rod and reel accessory which will prevent the fishing line on the rod and reel from getting entangled while the rod and reel is being stored or transported and which will simultaneously prevent the hook from becoming free and hence constituting a serious danger.

Another object is to provide a novel and improved fishing rod and reel accessory which will resiliently prevent the reel from turning and thereby loosening the line and which will cause the reel to return to its original position even though bumping or the like of the reel handle may cause the reel to be turned a limited distance, to thereby maintain the line in taut condition when the free end thereof is secured by means of the hook to the reel.

Another object is to provide a novel and improved fishing rod and reel accessory constructed and arranged to completely cover the hooks of a multiple-hook fish lure, when the accessory is utilized to prevent the fishing line from getting entangled while the rod and reel is being stored or transported, in order to prevent engagement of foreign objects by the hooks.

Another object is to provide a novel and improved fishing rod and reel accessory constructed and arranged to function either to maintain the line and reel in a fixed position during storage or transportation of the rod and reel or to anchor the rod and reel to a boat or similar object while preventing the line from being pulled out under normal circumstances.

These and other objects and advantages of my invention will more fully appear from the following description made in connection with the accompanying drawings wherein like reference characters refer to the same or similar parts throughout the several views and in which:

Fig. 1 is a fragmentary elevational view of a reel and fishing rod with one embodiment of my invention applied thereto to facilitate storage and transport of the rod and reel.

Fig. 2 is a plan view of the accessory.

Fig. 3 is an elevational view of the locking button which may be utilized in conjunction with the embodiment of my invention shown in Figs. 1 and 2 to secure a fishing rod and reel to a boat or similar object as illustrated in Fig. 5.

Fig. 4 is a second embodiment of the invention.

Fig. 5 is a partial elevational partial sectional view of a fishing rod and reel anchored to a boat through the use of my invention.

When fishing with a rod equipped with a reel, it is common for the user, after completing his fishing activities, to engage the hook on the end of the line (which is used in fishing operation) with the reel and to thereafter wind the reel until the line is taut in order to prevent the hook from swinging about and thereby endangering the user and others. The user generally sets the reel brake so as to tend to avoid unwinding of the line in the event the line or the hook is caught on some object in such a manner as to draw the line from the reel. Conventional reel brakes are generally of insufficient strength to prevent the line from being drawn from the reel when it is caught on some other object and thus the line may be pulled loose and thereafter it will remain in a loosened condition, and continue to fly about and become entangled with the result that frequently the hook will be disengaged from the reel and become caught in clothing or some part of the body of the user or others. It is also common practice for a fisherman to similarly arrange the line and hook for transporting his rod and reel. It is also common practice to place the rods and reels side by side when storing them or when packing them for transportation during travel to and from various locations. Under such circumstances the line and hook may become entangled with other fishing rods and reels or with other lines or with other portions of the same line adjacent the reel. My invention is designed to eliminate these disadvantages and provide a simple and improved accessory which will not only prevent the line from becoming loose and entangled but will also urge and cause the reel to return to its original position even though it may be partially unwound and which will also afford a substantial measure of protection against the hook becoming caught on foreign objects.

Referring to the drawings in detail, there is shown a fishing rod indicated generally as 6 having a handle 7 at one end with a reel indicated generally as 8 suitably mounted thereon. Attached to the handle is a rod which is equipped with the usual guides 9 (only one being shown). The reel thereon is of the usual type which includes a spindle 13 and a pair of side plates connected together by posts 10. The reel 8 is mounted on the handle 7 and is provided with a suitable operating handle 11. As shown this handle or crank 11 has two opposite ends 11a and 11b as is conventional on reels of this type. The line 12 is mounted upon the reel 11 by winding same on the spindle 13 and extends outwardly from the spindle through the guides 9 and at other end is secured to a suitable fishing device such as a hook 14. The hook 14 is shown in the drawing as being in an inactive position and is fastened to one of the posts 10 of the reel 8, the line 12 extending from the outer end of the rod 6 back again to the reel 8 in order to permit the hook 14 to be so secured.

It will be understood that the hook 14 may be secured, when not being used, to the posts 10 of the reel, as shown, or to some other suitable anchoring portion adjacent the handle 7 so long as the line 12 is held under tension. After the hook 14 has been secured to the post as shown, the reel operating handle 11 is turned sufficient to place the line 12 under tension. This is a common practice used by fisherman in order to avoid disassembling the rod and reel and at the same time prevent the hook from engaging other objects and the line from becoming loosened and entangled. Normally the reel brake (not shown) is applied in an effort to maintain the line 12 under tension. This arrangement however, has serious disadvantages in that the reel brakes are usually insufficient to prevent the line from being drawn off the spindle in the event that it catches upon some foreign object. When this happens, the line not only becomes entangled but the hook becomes disengaged from the post 10, thereby constituting a serious danger in handling and transporting the same.

In accordance with the present invention, I have provided an elongated longitudinally stretchable strip of elastic material such as rubber and indicated generally by the numeral 15 as shown in Fig. 2. This elastic strip has apertured end portions 15a and 15b and intermediate portion 15c. The end portion 15a has a pair of apertures 16 and 17 formed therethrough, these apertures being spaced longitudinally of the strip 15. The other end portion 15b has a single aperture 18 formed therethrough.

In use, the elastic strip 15 is applied to the rod and reel as shown in Fig. 1 so that the intermediate portion 15c is wrapped around the rod 6 and the line 12 under tension at a point adjacent the reel, and the end portions 15a and 15b are secured to opposite end portions 11a and 11b of the handle 11 in the manner shown, the laterally extending portion of the handle 11 being passed through the apertures 16 and 18. In this manner the line 12 is maintained in taut condition through the resilient action of intermediate portion 15c. At the same time the reel is prevented from rotating by the resilient action of the end portions 15a and 15b. Thus the spindle 13 of the reel is prevented from turning and thereby the line is prevented from being drawn off the spindle and becoming entangled. It will be noted that even though the line 12 may engage some foreign object to cause the spindle of the reel to turn a limited extent, the resilient action of the end portions 15a and 15b will cause the reel handle 11 and spindle to return to their original position, and thereby maintain the line in taut condition.

Fig. 4 shows a second embodiment of my invention wherein the accessory consists of an elongated strip 20 of elastic material such as rubber having a relatively wide intermediate portion 20c and relatively narrow end portions 20a and 20b. The end portion 20a has an aperture 21 extending therethrough. The end portion 20b has an aperture 22 extending therethrough. This embodiment is applied in the same manner in the embodiment shown in Fig. 2, but has an added advantage in that the relatively wide intermediate portion 20c will completely cover any multi-hook lure which may be used at the end of the line 12 in lieu of the hook 14. This relatively wide intermediate portion 20c will preclude clothing and other foreign objects from being engaged by one of the hooks of the lure and will serve to prevent children as well as adults from having their fingers pierced inadvertently by such multi-hooks.

Fig. 5 discloses how my fishing rod and reel accessory may be satisfactorily utilized as an anchor for a fishing rod and reel to a fixed object such as a strap 22 secured to the side of a boat 23, the strap extending between the side of the boat and seat portion 24. The rod and reel are placed so that the handle rests upon the seat portion 24 and the rod 6 rests upon the upper edge of the boat 23. The end portion 15a of the strip 15 is then passed around the strap 22. Thereafter, the double headed button 25 has one of its heads 25a and 25b passed through the apertures 16 and 17 to thereby anchor the end portion 15a to the strap 22. The intermediate end portion 15c of the strip 15 is then wound or wrapped around the rod 6 and other end portion 15b is secured to the handle 11 under tension. The intermediate portion 15c is wrapped around the rod 6 a sufficient number of times so the end portion 15b will be under tension when secured to the handle 11 in the manner shown in Fig. 5. In this manner the rod is positively secured to the boat and the line 12 is prevented from being drawn outwardly rapidly from the reel 8.

From the above it will be seen that I have provided a simple and inexpensive rod and reel accessory which resiliently holds a line taut and thereby prevents the line from becoming entangled and the hook from becoming disengaged from the reel and subsequently engaging foreign objects. It will be readily appreciated that my accessory is inexpensive and easy to apply and utilize.

It will, of course, be understood that various changes may be made in the form, detail, arrangement and proportion of the parts without departing from the scope of my invention which consists of the matter described herein and set forth in the appended claims.

What I claim is:

1. A combination fishing rod and reel attachment adapted to be used with a rod and a fishing reel of the type which includes a spindle upon which a line is wound and from which the line extends along the rod and a handle by means of which the reel is operated, said attachment comprising an elongated longitudinally stretchable solid strip of elastic material flat throughout its length and having portions intermediate its ends adapted to be wrapped under tension around the rod and line adjacent the reel to hold the line against shifting longitudinally of the rod and having means at each of its end portions adapted to engage the handle of the reel to cause said elastic strip to resiliently hold the same under tension against rotary movement whereby the line on the spindle and the rod will be prevented from becoming loose and entangled.

2. The combination of a fishing rod having a handle, a reel secured to said rod and including a spindle and a handle by means of which said reel is operated and a pair of side plates interconnected by a plurality of posts, a line wound on said spindle and extending outwardly therefrom along said rod and back again to said reel, a hook carried at the end of said line and engaging one of the posts of said spindle, an elongated longitudinally stretchable non-tubular strip of elastic material having portions intermediate its ends wound under tension around said rod and line above said rod handle and adjacent said reel to hold said hook from becoming disengaged and said line from becoming entangled, said strip having end portions each of which is connected under tension to said reel handle and resiliently holding the same against rotary movement whereby said line on said spindle will be prevented from becoming loose and entangled.

3. A combination fishing rod and reel attachment adapted to be used wtih a rod and fishing reel of the type which includes a spindle upon which a line is wound and from which the line extends along the rod and a handle by means of which the reel is operated, and a pair of side plates interconnected by a plurality of posts, said attachment comprising an elongated longitudinally stretchable strip of elastic material solid throughout its length and having apertured end portions each adapted to engage the handle of the reel and having non-tubular intermediate portions whereby the intermediate portions of said strip may be wound under tension around the rod and line adjacent the reel and the end portions of said strip may be placed while under tension in engaging relation to the handle of the reel to effectively prevent the line from becoming loose and entangled.

4. The attachment defined in claim 3 wherein said intermediate portions are flat and substantially wider than said end portions to effectively cover a lure which may be secured to the free end of the line and engaging one of the posts of the reel whereby the lure will be prevented from engaging other objects which the rod and reel may bump against.

5. The attachment defined in claim 3 wherein one of the end portions of said elastic strip has a plurality of apertures formed therethrough and spaced longitudinally of said strip, and a double headed button adapted to extend through said apertures in said strip whereby one end portion of said strip may be attached to the reel under tension in engaging relation with its handle and said intermediate portions may be wound under tension around the rod and line adjacent the reel and said other end portion having a plurality of apertures may be passed while under tension around a fixed object and secured thereto by passing one head of said button through two of said apertures to thereby effectively anchor the rod and reel to said object.

References Cited in the file of this patent

UNITED STATES PATENTS 2,424,419   Rosa _____ July 22, 1947